Aug. 21, 1951  B. J. MAYLAND  2,564,985
HYDROCARBON SYNTHESIS PROCESS
Filed July 15, 1949
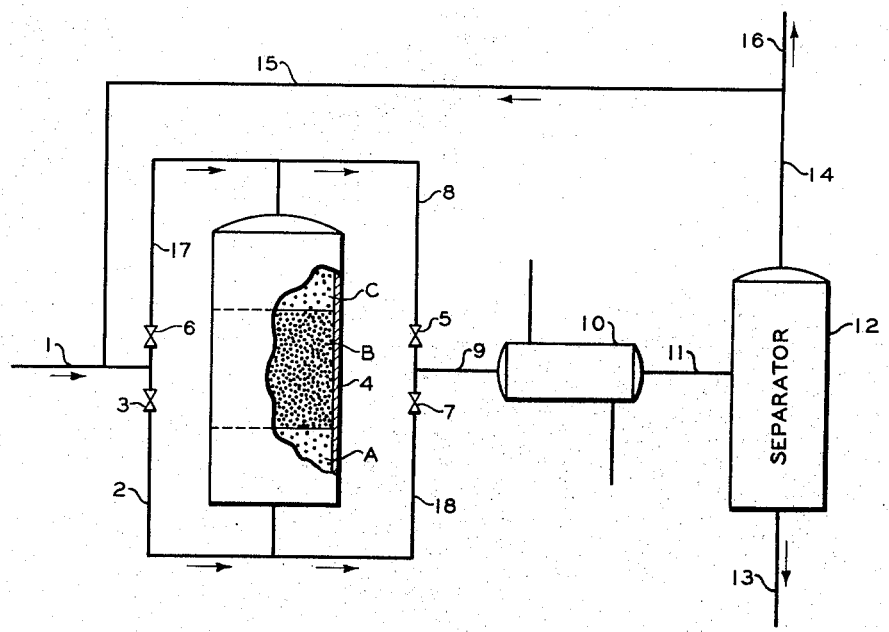
INVENTOR.
B. J. MAYLAND
BY Hudson and Young
ATTORNEYS Patented Aug. 21, 1951

2,564,985

UNITED STATES PATENT OFFICE 2,564,985

HYDROCARBON SYNTHESIS PROCESS

Bertrand J. Mayland, Bartlesville, Okla., assignor to Phillips Petroleum Company, a corporation of Delaware Application July 15, 1949, Serial No. 104,923

8 Claims. (Cl. 260—449.6)

This invention relates to an improved method of hydrogenating a carbon oxide to produce hydrocarbons and oxygenated organic compounds. In a specific aspect this invention relates to the reaction of hydrogen and carbon monoxide in the presence of a fixed bed reduced iron catalyst to produce organic compounds. In one embodiment this invention relates to a novel method of contacting a gaseous mixture of hydrogen and carbon monoxide with a fixed bed reduced iron catalyst.

There are various methods of operating a hydrocarbon synthesis reaction, commonly termed the Fischer-Tropsch synthesis reaction, wherein a gaseous mixture of hydrogen and carbon monoxide is contacted with a suitable catalyst at an elevated temperature and pressure. However, the two methods that have received the most attention and that have been developed commercially are the fixed bed process and the fluidized bed process. The latter process has a number of advantages over the former such as higher productivity per volume of catalyst, higher efficiency of production of desirable products, and greater flexibility of operating conditions.

Various materials catalyze the hydrocarbon synthesis reaction. Metals selected from group VIII of the periodic system and including iron, cobalt, nickel, and ruthenium have been used, and these metals may be promoted with known promoting materials, such as oxides of the alkali and alkaline earth metals, silica, thoria, and the like and supported upon known supporting materials, such as kieselguhr. Promoted and reduced iron catalysts are especially desirable because of the low cost and availability of the iron. However, iron catalysts are sensitive to water vapor, and, in contact with a gas having even a relatively low water to hydrogen ratio, iron is oxidized to iron oxide in accordance with the equation

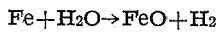

Consequently, the catalytic activity of the iron is diminshed. For the above reaction the equilibrium mol ratio of water to hydrogen is about 0.1 at typical hydrocarbon synthesis conditions, i. e. a temperature of about 600° F. and a pressure of about 300 p. s. i. Since the effluent gas from a hydrocarbon synthesis, effected with a recycle ratio of normally gaseous reaction effluent to fresh feed gas of 3.4:1 and at a conversion level of carbon monoxide about 98 per cent, may contain 7 mol per cent water as a reaction product and 28 mol per cent hydrogen for a mol ratio of water to hydrogen of 0.25, it is evident that conditions exist within the reactor which affect the catalyst adversely in accordance with the above equation. If water is introduced to the reactor with the feed gas, the adverse conditions are aggravated. Also, if the synthesis is effected with a recycle ratio of normally gaseous reaction effluent to fresh feed gas lower than 3.4:1, which is more desirable for economical operation, the mol ratio of water to hydrogen is higher than 0.25.

With a fluidized bed method of operating, the adverse poisoning effect of water vapor is not a serious factor. The finely divided catalyst particles are in continual turbulent motion, and they migrate between zones of reducing conditions near the feed gas inlet and zones of oxidizing conditions. The net effect of the turbulent movement and migration is a bed of catalyst of substantially uniform activity, and the effect of the water vapor on the iron catalyst is relatively slight. By suitable adjustment of the types and amounts of promoting materials that are added to the iron catalyst the effect of the water vapor can be further reduced.

In a fixed bed method of operating, the adverse poisoning effect of water vapor is much more serious and detrimental than in a fluidized bed. During operation that portion of the catalyst bed near the outlet for the reaction effluent is in contact with a gas having a high mol of water to hydrogen, and, as a result, that portion of the catalyst bed becomes deactivated. Thus, high conversion of carbon monoxide per pass cannot be effected in a conventional fixed bed system, and in actual practice a two or more step process with condensation and removal of water between steps is used to obtain high carbon monoxide conversion levels. The effect of the water vapor may be partially prevented by the use of relatively low reaction temperatures with a highly active catalyst. However, this method of operation is disadvantageous since the lower temperature processes are less flexible as to the type of products than the higher temperature processes and since the products from lower temperature processes are more highly paraffinic and less desirable for motor fuels than the products from higher temperature processes. The adverse poisoning effect of water vapor may be avoided by using catalysts other than iron, such as cobalt. Cobalt is relatively insensitive to water vapor in a hydrocarbon synthesis process since the equilibrium molar ratio of water to hydrogen at a temperature of 600° F. and a pressure of 300 p. s. i. is 50 for the reaction

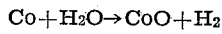

However, cobalt catalysts are expensive for commercial use in a hydrocarbon synthesis.

It is an object of this invention to provide a novel process for effecting hydrocarbon synthesis reactions.

It is another object of this invention to provide a novel process for contacting a gaseous mixture of hydrogen and carbon monoxide with a fixed bed of catalyst for the reaction to produce organic compounds.

It is a further object of this invention to provide a novel process for contacting a gaseous mixture of hydrogen and carbon monoxide with a fixed bed of an iron catalyst in a manner that the undesirable affect of water vapor is avoided.

It is a further object of this invention to avoid difficulties encountered in the prior art in contacting a gaseous mixture of hydrogen and carbon monoxide with a fixed bed iron catalyst to produce hydrocarbons and oxygenated derivatives thereof.

Further and additional objects of this invention will be readily manifest from my disclosure hereinbelow.

I have found that, when using a fixed bed iron catalyst for a hydrocarbon synthesis reaction, the adverse effect of water vapor can be avoided by periodically reversing the direction of flow of the feed gas through the bed of catalyst. The feed gas which consists of fresh synthesis gas and recycle gas is alternately passed into one end of the reactor and then the other. During that part of the operating cycle that the flow of gas is in one direction the catalyst in the portion of the catalyst bed nearest the outlet of the reactor for withdrawal of reaction effluent therefrom becomes deactivated by the oxidation of the iron in the presence of the water vapor. When the flow of gas through the catalyst bed is reversed, the deactivated catalyst is reactivated in the reducing medium of the influent gas, and the catalyst in the portion of the catalyst bed at the opposite end of the bed becomes deactivated.

My invention can be readily understood by referring to the accompanying drawing and the discussion hereinbelow. The accompanying drawing is a schematic diagram of one method of effecting my process. Conventional equipment, such as pumps, compressors, and the like, has not been included in this drawing in order to facilitate the understanding of my process, but the inclusion of such equipment is within the scope of my invention.

The catalyst that is used in my fixed bed process is preferably a reduced iron catalyst, and it may have incorporated therewith promoting materials, such as aluminum oxide, potassium oxide and calcium oxide in suitable proportions. In lieu of a reduced iron catalyst my process may also be practiced with a sintered iron catalyst.

The preferred temperature range is 285 to 320° C., but temperatures outside this range may be used. The pressure is superatmospheric and usually within the range of 5 to 20 atmospheres. Whenever the flow of gaseous reactants through the catalyst bed is reversed in my process, the reversal of flow is effected without any change in pressure. The space velocity of gaseous reactants through the catalyst bed is preferably within the range of 50 to 500 volumes of fresh synthesis gas per volume of catalyst per hour. The fresh synthesis gas contains hydrogen and carbon monoxide in molar ratios within the range of 1:1 to 3:1 and preferably within the range of 3:2 to 2.3:1.

Fixed bed hydrocarbon synthesis processes are usually practiced with a recycle of at least a portion of those components of the reaction effluent containing no more than three carbon atoms per molecule. This recycle gas from the reaction is used to dilute the fresh synthesis gases and to remove exothermic heat of reaction from the synthesis zone. Consequently, the recycle gas serves as a means for controlling the temperature of the synthesis reaction. Hydrocarbon syntheses may be practiced with volumetric ratios of recycle gas to fresh synthesis gas of 4:1 and higher, but in my process I prefer to use recycle ratios not above 2:1. As pointed out above, at these recycle ratios the molar ratio of water to hydrogen in the reaction zone affects the catalyst adversely, but my process overcomes this adverse affect quite effectively.

In my process the flow of gas through the catalyst bed is continued in one direction until the portion of the catalyst bed at the exit of the flowing gases from the catalyst bed becomes substantially deactivated by oxidation of the catalytic iron to iron oxide. The flow of gases through the bed is then reversed without any change in pressure. By reversal of the gas flow the deactivated oxidized iron is contacted with fresh synthesis gas which reduces the oxidized iron to catalytically active iron. The synthesis reaction is continued with the gases flowing in the reversed direction until the portion of the catalyst from which the reaction effluent is now emitted becomes substantially deactivated by oxidation of the iron. The flow of gases is again reversed without change in pressure, and the deactivated catalyst is reactivated while the synthesis reaction is continued. The length of time that the flow of gases is maintained in one direction or the optimum cycle length depends upon a number of variables, such as fresh synthesis gas composition, recycle ratio, reaction temperature, space velocity and the like. The optimum cycle length is usually within the range of 10 to 45 minutes, and at my preferred operating condition 30 minutes is the optimum cycle length.

The fixed bed of catalyst in my process may be of uniform catalytic activity throughout prior to passage of synthesis feed gases therethrough, but in an alternative embodiment of my invention the catalyst bed is composed of iron catalysts of differing degrees of activity. Since, in the cyclic process I have described hereinabove, it will not ordinarily be practical to operate with cycle lengths such that the portion of the catalyst bed at the entrance of the synthesis gas is completely reduced from iron oxide to iron, a more uniform catalyst activity throughout the catalyst bed is obtained by using a more active catalyst in the portions of the catalyst bed where the alternating oxidation and reduction of the catalyst occurs than in the central portion of the catalyst bed where substantially less oxidation and reduction of the catalyst occurs. In the description of the accompanying drawing hereinbelow the relative proportions of the more active and the less active catalysts will be set forth.

For the alternative embodiment the more active catalyst and the less active catalyst may be obtained or produced in any suitable manner. For example, the more active catalyst may be an iron catalyst that has not been used as a catalyst for a synthesis reaction or it may be an iron catalyst that has been reactivated after use in a hydrocarbon synthesis. The less active catalyst may be an iron catalyst that has been partially deactivated by use in a hydrocarbon synthesis reaction. Alternatively, instead of using the more and the less active catalysts in my process, catalysts containing differing proportions of promoting materials incorporated therein may be used. Potassium oxide, when added to an iron catalyst, enhances the formation of normally liquid products during a hydrocarbon synthesis reaction, but the proportion of potassium oxide in the catalyst must be kept relatively low in order to prevent the formation of considerable quantities of heavy waxy hydrocarbons during the synthesis reaction. Iron catalysts containing from 0.05 to 1.0 weight per cent potassium oxide are suitable for hydrocarbon synthesis reactions, and in my process the catalyst in the portions of the catalyst bed at the inlet and outlet extremities of the bed may contain proportions of potassium oxide within this expressed range. Since, in the central portion of the catalyst bed the concentration of reactant gases is lower than in the portion of catalyst bed nearer the point of introduction of feed gases, catalyst in the central portion of the bed may contain higher proportions of potassium oxide than the catalyst at the extremities of the bed. For example, the catalyst in the central portion of the bed may contain from 0.25 to 2.0, preferably 1.5, weight per cent potassium oxide. In place of potassium oxide other alkali metal oxides may be incorporated in the same proportions set forth above in the catalyst for my process.

Referring to Figure 1, synthesis gas containing hydrogen and carbon monoxide in a molar ratio of 2:1 enters the system via line 1. Recycle gas, from a source to be described infra, is admixed with the synthesis gas in a volumetric ratio of recycle to synthesis gas not above 2:1, and the gaseous mixture passes via line 2 and valve 3 to reactor 4. During this stage of the process valves 3 and 5 are open, and valves 6 and 7 are closed. Reactor 4 contains a fixed bed of an iron catalyst shown as zones A, B and C. In zones A and C, each of which represents about 25 per cent of the total catalyst bed, the iron catalyst contains about 0.5 weight per cent potassium oxide in addition to other known promoting metallic oxides. In zone B, which represents about 50 per cent of the total catalyst bed, the iron catalyst contains about 1.5 weight per cent potassium oxide. In reactor 4 the hydrocarbon synthesis reaction is effected at conditions set forth above, and the reaction effluent is withdrawn via line 8 and valve 5. Thence, the reaction effluent passes via line 9, condenser 10 and line 11 to separator 12 where the normally liquid reaction product is separated and withdrawn via line 13. The normally liquid product may then be subjected to further treatment, by means not shown, for recovery of the hydrocarbons and oxygenated organic compounds contained therein. Normally gaseous reaction effluent is withdrawn from separator 12 via line 14, and at least a portion thereof is recycled to reactor 4 via line 15. Any gaseous effluent not required for further operation of my process is vented via line 16.

The cycle of operations, described supra, is continued until the catalyst in zone C of reactor 4 becomes substantially deactivated by oxidation of the catalytic iron to iron oxide. Then valves 3 and 5 are closed, and valves 6 and 7 are opened, and, consequently, the flow of gases through reactor 4 is reversed. The feed gas now enters reactor 4 via valve 6 and line 17, and the reaction effluent is withdrawn from reactor 4 via line 18 and valve 7. The reversal of flow is effected without any substantial change in pressure in reactor 4, and the flow of gases in the reversed direction is continued until the catalyst in zone A becomes deactivated. During this time the catalyst in zone C has been reactivated by the reducing action of the feed gas on the oxidized iron, and upon deactivation of the catalyst in zone A the flow of gases is again reversed by opening valves 3 and 5 and by closing valves 6 and 7. The flow of gases is now in the direction of flow as originally described. The flow of gases through reactor 4 is usually maintained in one direction for about 30 minutes.

From my disclosure various modifications of my invention will be apparent to those skilled in the art, but these modifications will fall within the scope of my invention.

I claim:

1. The method of producing organic compounds from a gaseous mixture of hydrogen and carbon monoxide which comprises contacting said gaseous mixture with a fixed bed of an iron catalyst at an elevated temperature and at a superatmospheric pressure until a portion of said catalyst becomes deactivated by oxidation to iron oxide, periodically reversing the direction of flow of said gaseous mixture through said fixed bed of catalyst without change in reaction pressure to reactivate said deactivated catalyst, and recovering organic compounds thus-produced.

2. A method according to claim 1 wherein the direction of flow of gaseous mixture through the bed of catalyst is reversed at 10 to 45 minute intervals.

3. A method according to claim 2 wherein the direction of flow is reversed at 30 minute intervals.

4. A method according to claim 1 wherein at least a portion of the reaction effluent containing no more than three carbon atoms per molecule is recycled to the contacting step in a volumetric ratio of recycle gas to hydrogen-carbon monoxide gaseous mixture not above 2:1.

5. A method according to claim 1 wherein the catalyst in the center portion of the fixed bed of catalyst is less active catalytically than the catalyst at the inlet and outlet extremities of the catalyst bed.

6. A method according to claim 1 wherein the catalyst in the center portion of the fixed bed of iron catalysts contains a higher proportion of alkali metal oxide than the catalyst at the inlet and outlet extremities of the catalyst bed.

7. A method according to claim 6 wherein the iron catalyst in the center portion of the catalyst bed contains from 0.25 to 2.0 weight per cent potassium oxide and wherein the iron catalyst at the inlet and outlet extremities of the catalyst bed contains a lower proportion of potassium oxide within the range of 0.05 to 1.0 weight per cent.

8. A method according to claim 1 wherein the temperature is within the range of 285 to 320° C., the pressure is within the range of 5 to 20 atmospheres, and the molar ratio of hydrogen to carbon monoxide is within the range of 3:2 to 2.3:1.

BERTRAND J. MAYLAND.

REFERENCES CITED

The following references are of record in the file of this patent:

UNITED STATES PATENTS

| Number | Name | Date |
|---|---|---|
| 1,915,363 | Hanks et al. | June 27, 1933 |
| 2,231,990 | Dreyfus | Feb. 18, 1941 |
| 2,251,554 | Sabel | Aug. 5, 1941 |